US010219233B2

(12) United States Patent
Singh et al.

(10) Patent No.: US 10,219,233 B2
(45) Date of Patent: Feb. 26, 2019

(54) SYSTEM AND METHOD FOR IMPROVED PROPAGATION OF DYNAMIC LINK INFORMATION IN A TIME SYNCHRONIZED CHANNEL HOPPING NETWORK

(71) Applicant: LANDIS+GYR INNOVATIONS, INC., Alpharetta, GA (US)

(72) Inventors: Shobhit Kumar Singh, Ghaziabad (IN); Ankush Sabharwal, New Delhi (IN)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 0 days.

(21) Appl. No.: 15/664,657

(22) Filed: Jul. 31, 2017

(65) Prior Publication Data

US 2019/0037506 A1    Jan. 31, 2019

(51) Int. Cl.
*H04W 56/00*  (2009.01)
*H04W 72/04*  (2009.01)
*H04W 74/08*  (2009.01)
*H04W 76/10*  (2018.01)

(52) U.S. Cl.
CPC ..... *H04W 56/001* (2013.01); *H04W 72/0446* (2013.01); *H04W 74/0808* (2013.01); *H04W 76/10* (2018.02)

(58) Field of Classification Search
CPC ............ H04W 76/10; H04W 72/0446; H04W 74/0808; H04W 56/001–56/0095
See application file for complete search history.

(56) References Cited

PUBLICATIONS

Brett et al., "Re: [6tisch] charter 2.00", https://www.ietf.org/mailman/listinfo/6tisch, Oct. 7, 2015, 2 pages.
Palattella et al., "Traffic Aware Scheduling Algorithm for Reliable Low-Power Multi-Hop IEEE 802.15.4e Networks", 23rd International Symposium on Personal, Indoor and Mobile Radio Communications—(PIMRC), 2012, pp. 327-332.

*Primary Examiner* — Kashif Siddiqui
(74) *Attorney, Agent, or Firm* — Kilpatrick Townsend & Stockton LLP (57) ABSTRACT

A coordinator node may dynamically allocate links for communication in a network and communicate the link allocations via beacons. The beacons include a dynamic allocation change detection IE, which the coordinator node adjusts each time it modifies the link allocations. A receiving node receives the beacon and uses the value of the dynamic allocation change detection IE to determine whether the link allocations have been modified. The coordinator node may transmit the beacons during scheduled beacon slots or shared links. If the coordinator node transmits a beacon during a shared link, it may also initiate communication of the beacon early during the slot. A receiving node may in turn transmit its data early in its newly allocated link, if it fails to transmit previously in this link due to a CCA failure.

12 Claims, 7 Drawing Sheets

FIG. 1

|  | TIME SLOT 1 | TIME SLOT 2 | TIME SLOT 3 | TIME SLOT 4 | TIME SLOT 5 | TIME SLOT 6 | TIME SLOT 7 | TIME SLOT 8 | TIME SLOT 9 | TIME SLOT 10 |
|---|---|---|---|---|---|---|---|---|---|---|
| CHANNEL 9 | | | | | | | | | | |
| CHANNEL 8 | | | | | | | | | | |
| CHANNEL 7 | | | | | X | | | | X | |
| CHANNEL 6 | | X | | | | | X | | | |
| CHANNEL 5 | | | | X | | | | | | |
| CHANNEL 4 | X | | | | | X | | | | X |
| CHANNEL 3 | | | X | | | | | X | | |
| CHANNEL 2 | | | | | | | | | | |
| CHANNEL 1 | | | | | | | | | | |

SYSTEM AND METHOD FOR IMPROVED PROPAGATION OF DYNAMIC LINK INFORMATION IN A TIME SYNCHRONIZED CHANNEL HOPPING NETWORK

FIELD OF THE INVENTION

The present invention is directed to improvements in the propagation of dynamic link information and to the mitigation of interference caused by delayed or incomplete propagation, including improvements in the speed and probability of propagating dynamic link information in a TSCH network.

BACKGROUND

Nodes in a time synchronized channel hopping (TSCH) network, such as described by IEEE 802.15.4e, are allocated links for communication. A PAN (Personal Area Network) coordinator may control the link allocations for the nodes in the PAN and may periodically transmit link allocation information in a beacon. The PAN coordinator may modify the link allocations in response to changing network conditions. When network conditions are changing, it is desirable to adjust the link allocations to address the changed conditions and to propagate the changes through the network as quickly as possible.

SUMMARY

Aspects of the invention include a coordinator node that dynamically allocates links for communication between nodes. When the coordinator node modifies the link allocations, it updates the nodes via a beacon that includes a user defined information element, which is referred to herein as a dynamic allocation change detection IE. The value of the dynamic allocation change detection IE is adjusted each time the coordinator node modifies the link allocations. Upon receiving the beacon, a receiving node uses the value of the dynamic allocation change detection IE to determine whether the link allocations have been modified. The coordinator node may transmit the beacon during the next scheduled beacon advertisement slot and may also transmit the beacon during the next shared link. If the coordinator node transmits the beacon during a shared link, it may initiate an early communication of the beacon.

After receiving a modified link allocation, the receiving node may use the modified link allocation to transmit a communication on the network. If a transmission by the receiving node on a newly allocated link experiences a CCA failure, then the node communicates early during all subsequent occurrences of its newly assigned link until it receives another beacon.

These illustrative aspects and features are mentions not to limit or define the invention, but to provide examples to aid understanding of the inventive concepts disclosed in this application. Other aspects, advantages, and features of the present invention will become apparent after review of the entire application.

DETAILED DESCRIPTION

Systems and methods are provided that facilitate the dynamic allocation of communication links to nodes in a TSCH network. A coordinator node may monitor network conditions and based on the conditions modify the link allocations for the nodes on the network. The link allocations are communicated to the nodes via a beacon that includes a dynamic allocation change detection IE. The value of the dynamic allocation change detection IE allows a receiving node to detect that the link allocations have been modified. To speed up the propagation of the modified link allocations through the network, the coordinator node may transmit a beacon during a shared link in addition to transmitting it on the next beacon slot. Additionally, the coordinator node may initiate transmission of the beacon early in the shared link.

Exemplary Operating Environment

Figure 1:
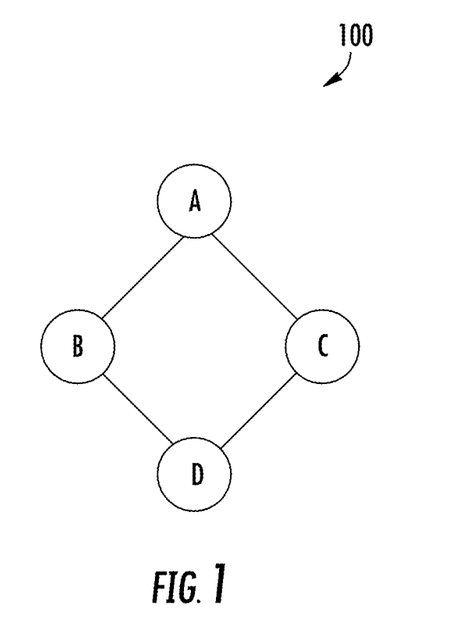
FIG. 1 is a block diagram illustrating an exemplary network.

FIG. 1 illustrates a portion of a time synchronized channel hopping network 100. The network includes nodes A, B, C, D. The nodes use time slots and a channel hopping pattern to communicate on the network. The hopping pattern defines the channel used to communicate during each time slot. The hopping pattern has a length, measured as a number of time slots, and the hopping pattern repeats. Only four nodes are illustrated in FIG. 1 for simplicity. The network may include additional nodes or use network topologies other than the one illustrated in FIG. 1.

Figure 2:
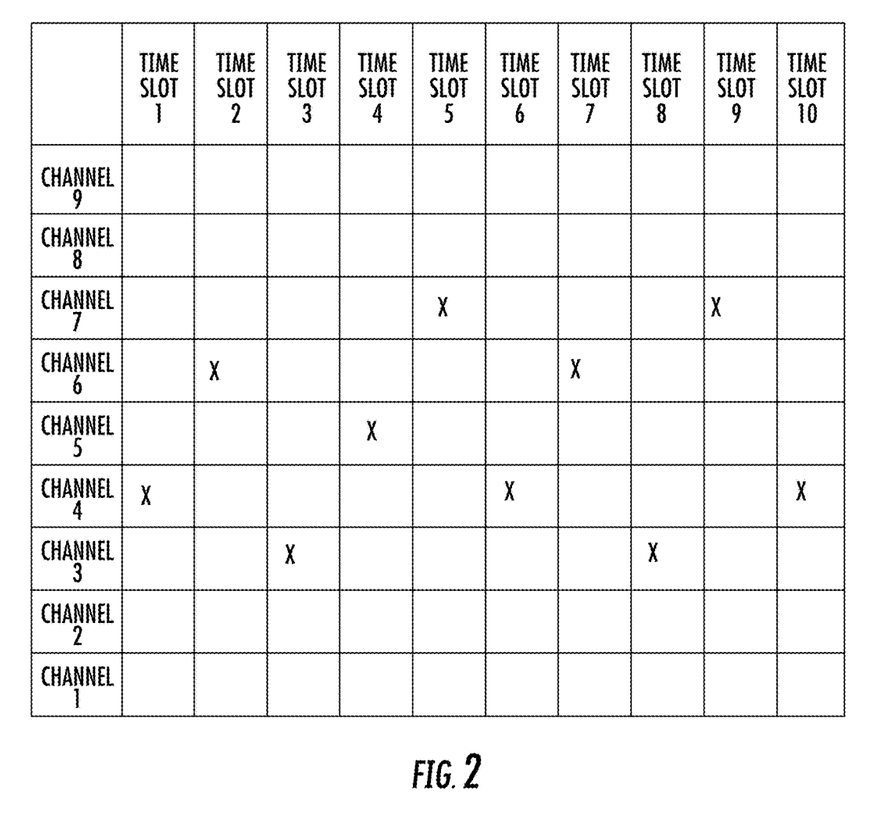
FIG. 2 is a diagram illustrating an exemplary hopping pattern.

FIG. 2 illustrates one example of how a hopping pattern defines a channel for each time slot. In this example, the hopping pattern is channel 4, channel 6, channel 3, channel 5, and channel 7 and it has a length of 5. Communications during time slot 1 use channel 4, communications during time slot 2 use channel 6, communications during time slot 3 use channel 3, communications during time slot 4 use channel 5, and communications during time slot 5 use channel 7. The hopping pattern repeats so communications during time slot 6 use channel 4, communications during time slot 7 use channel 6, etc. A channel offset may be used in addition to the channel hopping pattern to define the channel for communication. If the value of the channel offset is zero, then the channel used for communication is the same as the channel in the channel hopping pattern. If the value for the channel offset is non-zero, then the channel offset value is added to the channel defined by the channel hopping pattern to determine the channel used for communication. In this example, if the value for the channel offset for time slot 1 is 2, then the channel used for communication is 6 (channel 4+channel offset of 2=channel 6).

Node A in FIG. 1 may act as a coordinator node, also referred to herein as a PAN coordinator, and allocate communication links for the other nodes in the network. A communication link identifies a time slot for communication between two nodes and possibly a channel offset. The coordinator node sends information about the allocated links to the nodes using a beacon. The coordinator node may include an additional information element, referred to herein as a dynamic allocation change detection IE, in the beacon. The value of the dynamic allocation change detection IE indicates to the nodes whether there has been a change in the link allocations. The value of the dynamic allocation change detection IE is adjusted by a predetermined allocation adjustment value each time the coordinator node changes the link allocations. After a node receives a beacon, the node examines the value of the dynamic allocation element to determine if the value has changed from the previously received beacon. If the value has changed from the previously received beacon, then the node determines that the link allocations have changed. The value of the dynamic allocation element is not changed if the link allocations are modified because a node joins or leaves the network.

In one example, the network is part of a resource distribution network for distributing a resource, such as electricity, gas, or water, the coordinator node A is a collector node or a network router, and nodes B, C, D are associated with utility metering devices. The coordinator node may or may not include metering functionality and may be considered a Full Function Device (FFD).

In one example, the coordinator node transmits a beacon with the links shown in Table 1. Table 1 illustrates that three links are allocated to communications from node A to node B: time slot 1 with channel offset 2, time slot 4 with channel offset 3, and time slot 6 with channel offset 2. One link is allocated to communications from node B to node A: time slot 2, channel offset 1. Two links are allocated to communications from node B to node D: time slot 3, channel offset 0 and time slot 5, channel offset 1. One link is allocated to communications from node C to node D: time slot 4, channel offset 0.

TABLE 1

| Channel Offset |      |      |      |      |      |      |
|---|---|---|---|---|---|---|
|   |      |      |      | A=>B |      |      |
|   | A=>B |      |      |      |      | A=>B |
|   |      | B=>A |      |      | B=>D |      |
|   |      |      | B=>D | C=>D |      |      |

The links may be determined based on one or more network factors including, but not limited to: the number of packets (or other measure of quantity) transmitted and received by each node during a certain time period; a node type, such as a low power node or a high priority node; the priority of the communications being exchanged between nodes; the traffic distribution across the network, both current and historical; the number of currently allocated links for a node pair; and a communication received from a node. For example, the coordinator node may monitor the network during a time slot allocated to a pair of nodes to collect information about the quantity or type of communications between the nodes, the coordinator node may temporarily allocate additional consecutive links to a battery-powered node to provide the battery-powered node with sufficient bandwidth to complete its communications during a single wake cycle, the coordinator node may monitor communications on the network to identify high priority communications and allocate additional links to the node pairs exchanging the high priority communications, or the coordinator node may allocate additional links during certain times of day based on historic traffic levels.

In the example based on the link allocations in Table 1, the coordinator node monitors at least one of the network factors and based on the monitored factor(s) adds additional links for communication from node C to node D. The additional links may be provided by allocating currently unallocated links or by reassigning links currently allocated to other communications. Table 2 illustrates three additional links allocated for communications from node C to node D: time slot 1, channel offset 3, time slot 2, channel offset 0, and time slot 5, channel offset 1. Two of these links were unallocated links (time slot 1, channel offset 3 and time slot 2, channel offset 0) and one of these links was previously allocated to communications from node B to node D (time slot 5, channel offset 1).

TABLE 2

| Channel Offset |      |      |      |      |      |      |
|---|---|---|---|---|---|---|
|   | C=>D |      |      | A=>B |      |      |
|   | A=>B |      |      |      |      | A=>B |
|   |      | B=>A |      |      | C=>D |      |
|   |      | C=>D | B=>D | C=>D |      |      |

The coordinator node transmits a beacon with the link allocations shown in Table 2 and with the value of the dynamic allocation change detection IE adjusted by the allocation adjustment value. The coordinator node may continue to transmit beacons with the link allocations shown in Table 2 until it determines that it should restore the link allocations to those shown in Table 1 or that it should further modify the link allocations.

The coordinator node may transmit the beacon during a scheduled beacon advertisement slot or during a shared link. The coordinator node communicates link allocation information to a node when the node joins the network, which identifies the beacon advertisement slot(s) and shared links.

Exemplary Method of Operation of Coordinator Node

Figure 3:
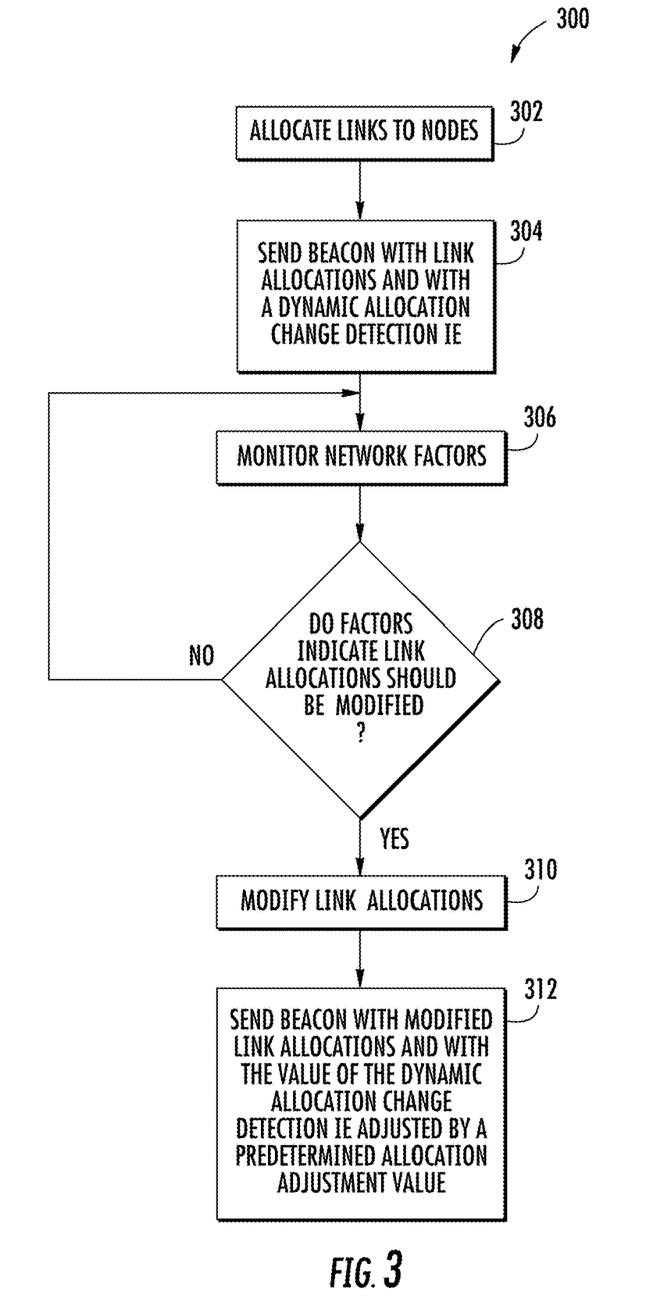
FIG. 3 is a flow diagram illustrating an exemplary method for allocating links and communicating information about the allocated links in a network.

FIG. 3 illustrates aspects of an exemplary method 300 performed by a coordinator node for dynamically allocating links. In 302, the coordinator node allocates links to the nodes in the network. Each link may define a time slot for communication from one node to another node and may include an optional channel offset. The coordinator node creates a beacon that includes the links and a dynamic allocation change detection IE.

The coordinator node sends the beacon to the nodes in 304. The coordinator node may send the beacon during the next scheduled beacon slot or may send the beacon in the next scheduled shared link. After the coordinator node sends the beacon, the coordinator node monitors one or more of the network factors in 306. In 308, the coordinator node determines whether the monitored factors indicate that the link allocation should be modified. When the coordinator node determines that the network factors indicate the link allocations should be modified, then the method proceeds along the Yes branch to 310. In 310, the coordinator node modifies the link allocations and in 312 the coordinator node sends a beacon in the next scheduled beacon advertisement slot with the modified link allocations and the dynamic allocation change detection IE. To speed up propagation of the modified link allocation, the coordinator node may also send a beacon during a shared link that occurs prior to the next scheduled beacon advertisement slot.

The value of the dynamic allocation change detection IE sent in the beacon in 312 is equal to the value of the dynamic allocation change detection IE sent in the previous beacon adjusted by the allocation adjustment value. In one example, the allocation adjustment value is one and the range of values for the dynamic allocation change detection IE is 0-255. The value of the dynamic allocation change detection IE may be incremented each time the coordinator node modifies the link allocations. In this example, if the value of the dynamic allocation change detection IE sent in the previous beacon was one, then the value of the dynamic allocation change detection IE for the beacon with the modified link allocations is two. When the value of the dynamic allocation change detection IE reaches a maximum value, e.g., 255, then the next time the value is adjusted, it is adjusted to the initial value, e.g., 0. The beacon with the modified link allocations may be sent during the next scheduled beacon slot or during a shared link.

When the determination at 308 is that the factors do not indicate that the link allocations should be modified, then the method proceeds along the No branch from 308 to 306 and the coordinator node monitors the network factors.

The coordinator node may send beacons in addition to those illustrated in FIG. 3. For example, during times when the network factors do not indicate that the link allocations should be modified, the coordinator node may still send beacons according to a beacon schedule or may modify link allocations to accommodate nodes joining or leaving the network. When a beacon includes modifications to previously assigned links, the value of the dynamic allocation change detection IE is adjusted. However, the value of the dynamic allocation change detection IE is not adjusted if the only modification to the link allocations is for a node joining or leaving the network.

Figure 4:
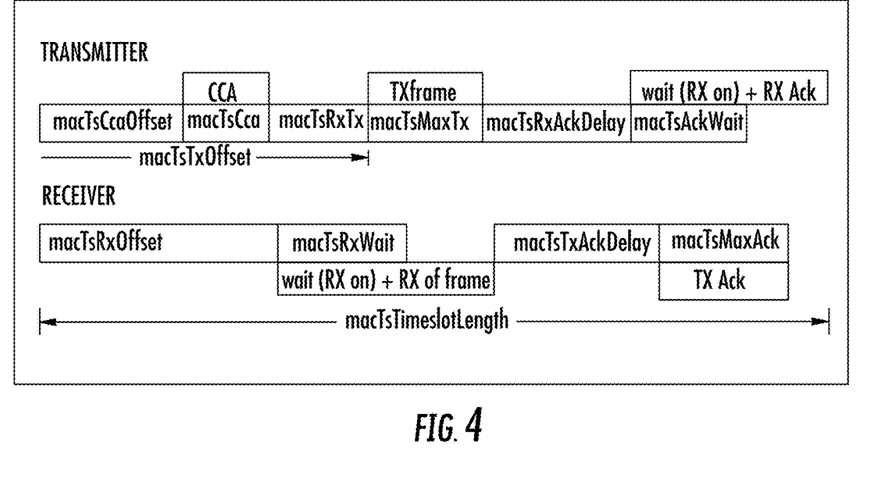
FIG. 4 is a timing diagram illustrating timing for an exemplary shared link.

When the coordinator node modifies the link allocations, it may send a beacon during a shared link that occurs prior to the next scheduled beacon slot to speed propagation of the modified link allocations through the network. In some instances, the coordinator node may also transmit the beacon early in the shared link. FIG. 4 illustrates an exemplary shared link, as described in the IEEE 802.15.4e-2015 standard. A shared link may include a CCA (Clear Channel Assessment) offset time, such as macTsCcaOffset, which defines the start of the CCA. When the coordinator node sends a beacon early in a shared link, it reduces the length of the CCA offset time so that it initiates the transmission of the beacon prior to the end of the default CCA offset time. For example, the coordinator node may shorten the macTSCcaOffset time by at least the value of macTSRxTx so that it initiates and finishes CCA earlier than competing nodes. The beacon is sent via a MAC frame, which is encapsulated in a PHY frame and the PHY frame is sent early in the time slot. By initiating the transmission of the beacon early in the shared link, the transmission is initiated prior to any transmission from a node competing for the shared link, which allows the coordinator node to use the shared link to transmit the beacon. The coordinator node shortens the transmit offset time, i.e., macTsTxOffset, by the same value as it shortened macTsCcaOffset, so that the transmit offset time is larger than the receive offset time, i.e., macTsRxOffset, of the receiving nodes. The receiving node recognizes that the message sent by the coordinator node during the shared link is a beacon by the value of the Frame type in the beacon MAC frame's frame control field, as described in Section 7.2.1.1 of the IEEE802.15.4-2015 standard.

Exemplary Method of Operation of a Node

Figure 5:
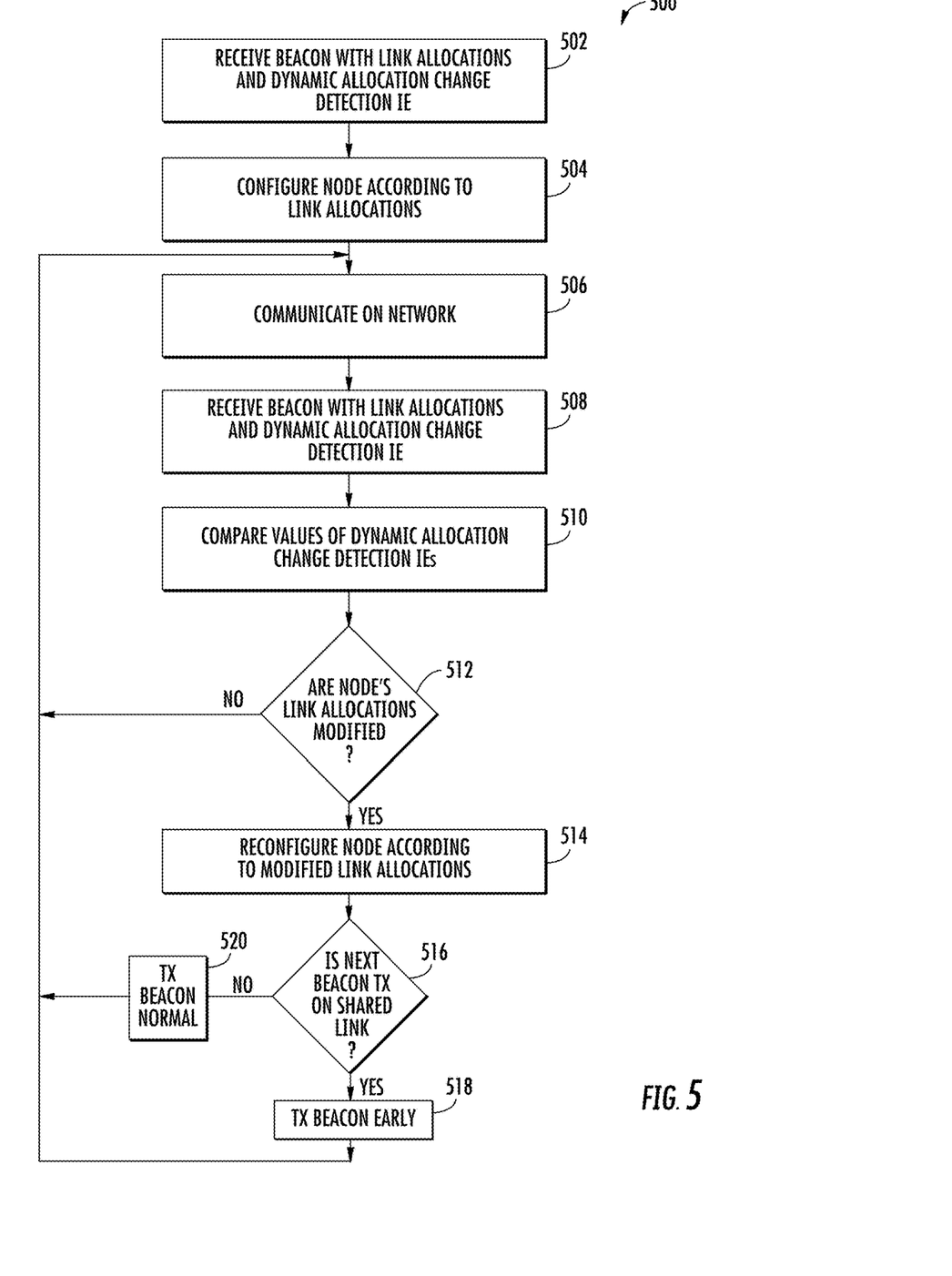
FIG. 5 is a flow diagram illustrating an exemplary method for managing allocated links at a node.

FIG. 5 illustrates an exemplary method 500 of operation for a node in the network that receives the beacon. In 502, the node receives the beacon with link allocations and a dynamic allocation change detection IE. The node uses the received link allocations to configure itself for communication on the network during its assigned link(s) in 504 and conducts communications on the network in 506. In 508, the node receives another beacon with link allocations and a dynamic allocation change detection IE. The node compares the value of the dynamic allocation change detection IE in the beacon received in 508 with the value of the dynamic allocation change detection IE in the previously received beacon at 510. When the values of the dynamic allocation change detection IEs are different, the node recognizes that the link allocations have been modified since the previously received beacon. In 512, the node determines whether its link allocations have been modified. If so, then the Yes branch is followed from 512 to 514 and the node reconfigures itself to communicate on the network using the modified link allocations. In addition, the node sends its beacon in the next shared link (516 and 518) or scheduled beacon advertisement slot (516, 520), whichever is earlier. If the node sends its beacon in the next shared link, then it is sent early. The beacon includes the same link allocations and dynamic allocation change detection IE as in the beacon it received. The method may proceed from 518 or 520 to 506 and the node may communicate on the network using the modified link allocations.

When the values of the dynamic allocation change detection IEs are the same at 510 indicating that the link allocations have not been modified, or when the determination at 512 is that the node's link allocations have not changed, even though the link allocations in the beacon have been modified, then the method proceeds along the No branch from 512 to 506.

Figure 6:
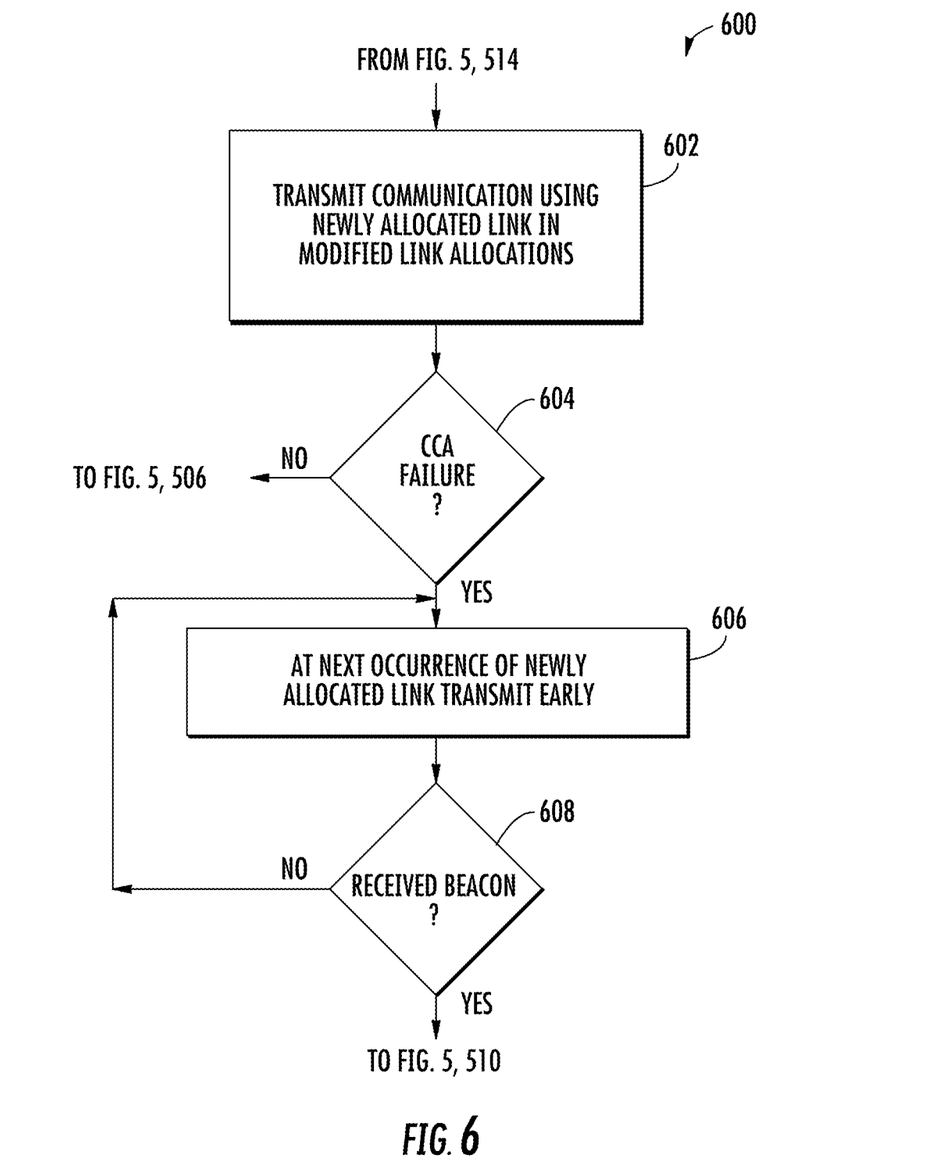
FIG. 6 is a flow diagram illustrating an exemplary method for handling a CCA failure associated with a newly allocated link.

In some implementations, the node may not be able to successfully transmit a communication on a newly allocated link due to a CCA failure. This may happen because another node in the network might have missed a beacon containing the modified link allocation information and thus, may still be communicating according to the older link allocation information in which it was allocated a link that it no longer allocated to it. This may result from factors, such as network congestion or interference. FIG. 6 illustrates aspects of an exemplary method 600 for handling this type of CCA failure associated with a newly allocated link. In one implementation, the method proceeds from 514 of FIGS. 5 to 602 of FIG. 6. In 602, the node transmits a communication on the network using a newly allocated link. If the transmission in the newly allocated link fails due to CCA failure in 604, the method proceeds along the Yes branch to 606. If the transmission does not fail due to a CCA failure, the method proceeds along the No branch. In one implementation the method returns to 506 of FIG. 5

In 606, the node transmits early during the next occurrence of the newly allocated link. The node transmits early by reducing the CCA offset time so that it begins its transmission prior to the expiration of the macTsCcaOffset+ macTsCca time. If the node does not receive a beacon at 608, then it transmits early during the next occurrence of the newly allocated link by following the No branch from 608 to 606. Once the node receives another beacon in 608, it no longer transmits early in the newly allocated link and may proceed to 510 in FIG. 5.

Exemplary Node Configuration

Figure 7:
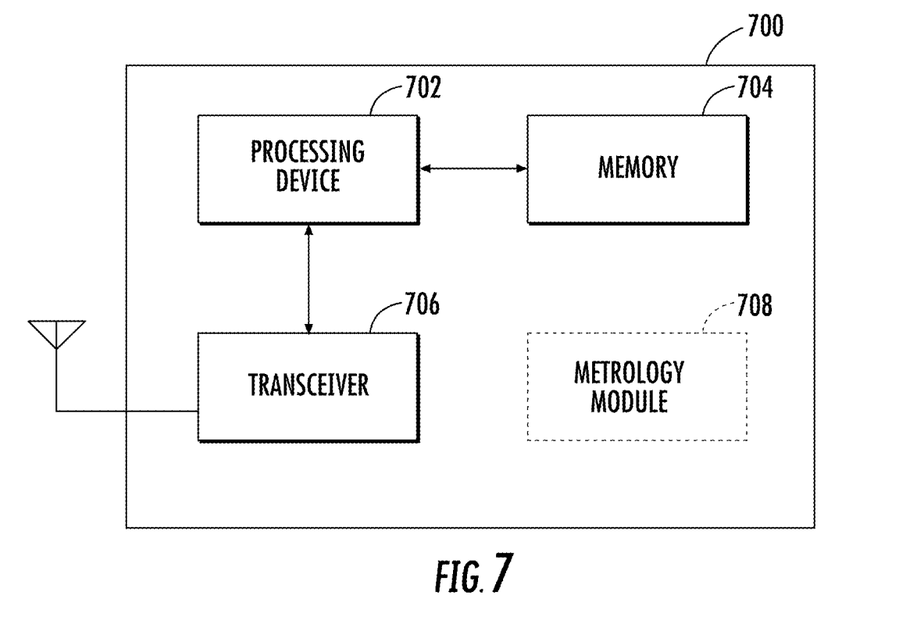
FIG. 7 is a block diagram illustrating an exemplary node.

FIG. 7 is a block diagram illustrating an exemplary node 700 for communicating on a TSCH network. The node includes one or more processing devices 702, which are coupled to computer-readable media, such as a memory device 704. The processing device may execute computer-executable instructions stored on the computer-readable media or access information stored on the computer-readable media to perform the operations described herein. The node also includes a transceiver 706 for transmitting and receiving communications on the TSCH network. The node may include additional or different modules and components than those illustrated in FIG. 7 may be included. For example, the node may also include a metrology module 708 for measuring and controlling a resource, such as electricity, gas, or water.

GENERAL CONSIDERATIONS

While the present subject matter has been described in detail with respect to specific aspects thereof, it will be appreciated that those skilled in the art, upon attaining an understanding of the foregoing, may readily produce alterations to, variations of, and equivalents to such aspects. For example, instead of using a user defined IE, such as the dynamic allocation change detection IE, an existing field, such as the sequence number field in the beacon MAC frame, may be used to indicate that the link allocations have been modified. Accordingly, it should be understood that the present disclosure has been presented for purposes of example rather than limitation and does not preclude inclusion of such modifications, variations, and/or additions to the present subject matter as would be readily apparent to one of ordinary skill in the art.

What is claimed is:

1. A method performed at a first node in a time synchronized channel hopping network, comprising:
   receiving a first beacon with a first link allocation and a first value for a dynamic allocation change detection IE, wherein the first link allocation identifies a first slot and a first channel for communication between the first node and a second node;
   configuring the first node to communicate with the second node during the first slot using the first channel;
   receiving a second beacon with a second link allocation and a second value for the dynamic allocation change detection IE, wherein the second link allocation identifies the first slot and the first channel for communication between the first node and the second node and identifies a second slot and a second channel for communication between the first node and the second node;
   comparing the first value for the dynamic allocation change detection IE and the second value for the dynamic allocation change detection IE; and
   when the first value for the dynamic allocation change detection IE differs from the second value for the dynamic allocation change detection IE, then reconfiguring the first node to communicate with the second node during the first slot using the first channel and during the second slot using the second channel, and communicating with the second node.

2. The method of claim 1, wherein communicating with the second node, comprises:
   transmitting a first communication to the second node during the second slot using the second channel;
   detecting a CCA (Clear Channel Assessment) failure for the first communication; and
   in response to detecting the CCA failure, at a next occurrence of the second slot following the CCA failure, transmitting a second communication to the second node early by initiating CCA using a CCA offset time that is less than a default CCA offset time.

3. The method of claim 2, further comprising:
   receiving a third beacon with the second link allocation and the second value for the dynamic allocation change detection IE; and
   at a next occurrence of the second slot following the third beacon, initiating CCA using the default CCA offset time.

4. The method of claim 1, further comprising:
   when the first value for the dynamic allocation change detection IE equals the second value for the dynamic allocation change detection IE, then maintaining the first link allocation.

5. The method of claim 1, wherein receiving a second beacon comprises receiving a second beacon during a shared link.

6. The method of claim 1, further comprising:
   after receiving the first beacon, transmitting a beacon by the first node during a next beacon advertisement slot or a shared link, wherein the beacon includes the first link allocation and the first value for the dynamic allocation change detection IE.

7. The method of claim 1, further comprising:
   sending a communication to a coordinator node requesting additional link allocations; and
   receiving a third beacon with a third link allocation, wherein the third link allocation identifies at least one additional slot for communication between the first node and the second node.

8. A method for handling a CCA failure associated with a newly allocated link performed at a first node in a time synchronized channel hopping network, comprising:
   receiving a first beacon with a first link allocation and a first value for a dynamic allocation change detection IE, wherein the first link allocation identifies a first slot and a first channel for communication between the first node and a second node;
   receiving a second beacon with a second link allocation and a second value for the dynamic allocation change detection IE, wherein the second link allocation identifies the first slot and the first channel for communication between the first node and the second node and additionally identifies a second slot and a second channel for communication between the first node and the second node;
   comparing the first value for the dynamic allocation change detection IE and the second value for the dynamic allocation change detection IE;
   when the first value for the dynamic allocation change detection IE differs from the second value for the dynamic allocation change detection IE, reconfiguring the first node to communicate with the second node during the first slot using the first channel and during the second slot using the second channel;
   transmitting a first communication to the second node during the second slot using the second channel;
   detecting a CCA (Clear Channel Assessment) failure for the first communication; and
   in response to detecting the CCA failure, at a next occurrence of the second slot following the CCA failure, transmitting a second communication to the second node early by initiating CCA using a CCA offset time that is less than a default CCA offset time.

9. The method of claim 8, further comprising:
   continuing to transmit communications to the second node on the second channel early during subsequent occurrences of the second slot until a third beacon is received.

10. The method of claim 8 further comprising:
    when the first value for the dynamic allocation change detection IE and the second value for the dynamic allocation change detection IE are equal, then at a next occurrence of the first slot, transmitting a communication on the first channel by initiating CCA using the default CCA offset time.

11. The method of claim 8, further comprising:

after receiving the first beacon, transmitting a beacon by the first node during a next beacon advertisement slot or a shared link, wherein the beacon includes the first link allocation and the first value for the dynamic allocation change detection IE.

12. The method of claim 8, further comprising:

after receiving the second beacon, transmitting a beacon by the first node during a next shared link using a CCA offset time that is less than a default CCA offset time.

* * * * *

UNITED STATES PATENT AND TRADEMARK OFFICE
CERTIFICATE OF CORRECTION

PATENT NO.        : 10,219,233 B2
APPLICATION NO.   : 15/664657
DATED             : February 26, 2019
INVENTOR(S)       : Shobhit Kumar Singh et al.

It is certified that error appears in the above-identified patent and that said Letters Patent is hereby corrected as shown below:

In the Specification

In Column 6, Line 39, delete "FIGS." and insert -- FIG. --, therefor.
In Column 6, Line 46, delete "FIG. 5" and insert -- FIG. 5. --, therefor.

Signed and Sealed this
Twenty-first Day of May, 2019

Andrei Iancu
*Director of the United States Patent and Trademark Office*